March 28, 1944.  H. ZIEBOLZ  2,345,525
FLOW PROPORTIONING APPARATUS
Filed July 31, 1941
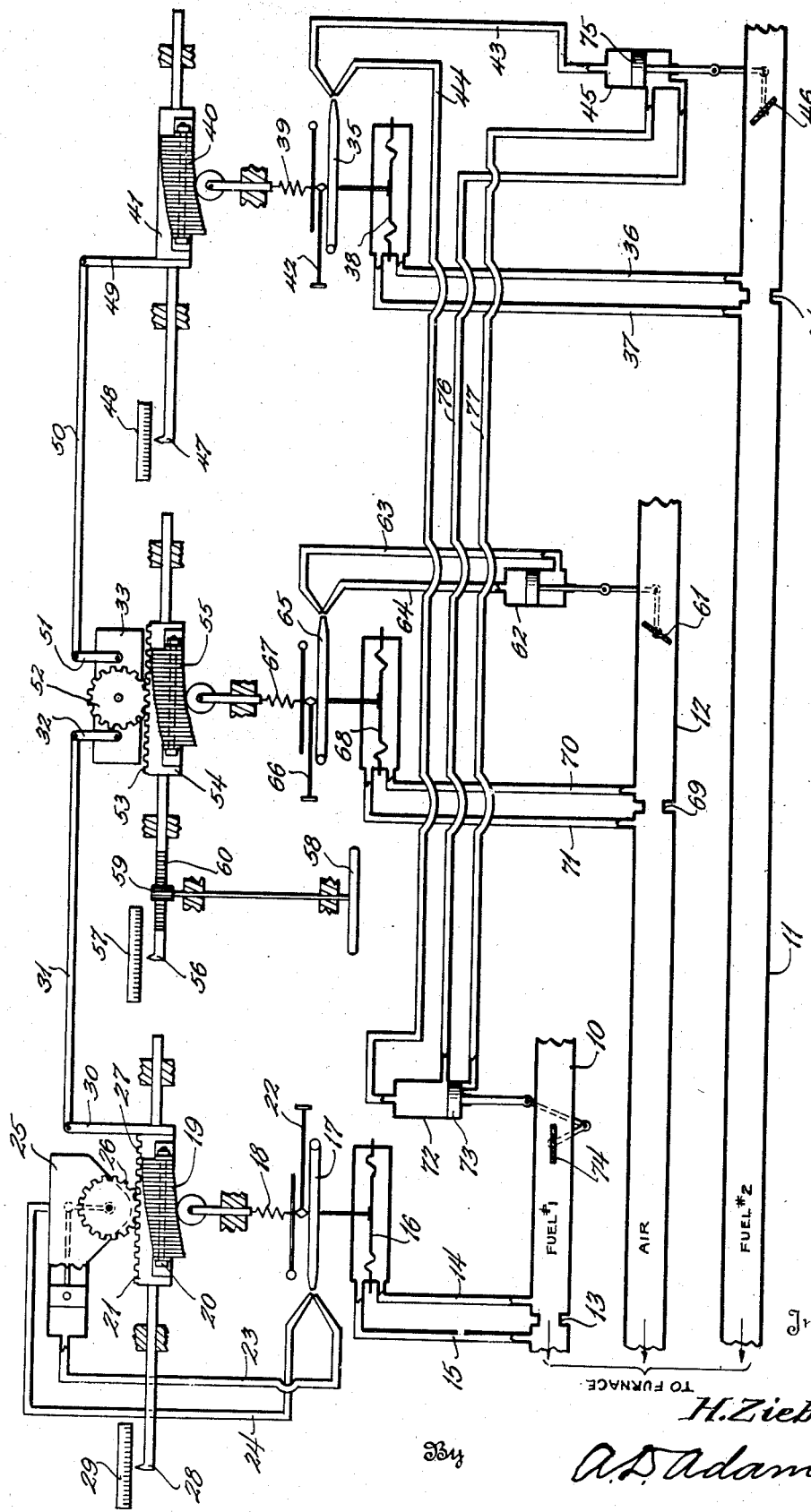
Inventor
H. Ziebolz
By A. D. Adams
Attorney Patented Mar. 28, 1944

2,345,525

UNITED STATES PATENT OFFICE 2,345,525

FLOW PROPORTIONING APPARATUS

Herbert Ziebolz, Chicago, Ill., assignor to Askania Regulator Company, Chicago, Ill., a corporation of Illinois Application July 31, 1941, Serial No. 404,912

9 Claims. (Cl. 137—164)

This invention relates to improved apparatus for proportioning and controlling the supply of separate fuels having different heating values in a furnace installation wherein the air supply is manually controlled and regulated in accordance with any desired heat input and in which a maximum available supply of a primary fuel is consumed, while the supply of a make-up or secondary fuel is automatically varied in response to changes in the flow of the primary fuel to make up the total heat demand. In some furnace installations the supply of primary fuel, such as coke oven gas, varies over a wide range and it is desired to consume a maximum quantity of this fuel. However, if the rate of flow of the primary fuel exceeds that necesary to meet the heat demand, it is desirable not only to cut off the supply of make-up fuel but also to reduce the rate of flow of the primary fuel so that it is always equal to the heat demand. It is therefore a further object to provide in a proportioning control system of this type, a secondary fuel regulator which controls the secondary fuel and associated means operated thereby to control the supply of primary fuel, alone, after the secondary fuel regulator cuts off the flow of the secondary fuel.

Heretofore, it has been suggested that rates of fuel flow be summarized by means of fuel flow meters or by pilot air flows which are directly proportional to the individual B. t. u. rates of fuel flow and the total air proportioned to the sum of the individual fuel flows in terms of their heating values. The design of such mechanisms is based on the fact that a definite amount of air is required for theoretically complete combustion of a given quantity of fuel in terms of its B. t. u. value. In the operation of industrial furnaces or boiler furnaces a number of factors must be taken into consideration which render the supply of the calculated or exact amount of air necessary for theoretically complete combustion, improper. Such factors do not vary as a direct function of the rate of fuel flow but present different values at different rates of fuel flow. Some of these factors are, for example, air used to atomize liquid fuels or primary air used for conveying pulverized fuel, which air is not subject to control by the well known air control apparatus. Such factors may be termed "burner factors." The calculated amount of air, which would be supplied by the control apparatus to support theoretically complete combustion of a single fuel, modified by the amount of air which finds its way into the burner installation by reason of these factors, is referred to herein as "compensated air requirements" of that fuel. If more than one fuel is supplied, the calculated amount of air which would be supplied by the control apparatus to support theoretically complete combustion of the plurality of fuels, modified by the amount of air which finds its way into the burner installation, as a result of the feeding of more than one fuel, is referred to herein as "totalized compensated air requirements" for the fuels. Further correction factors may be necessary in any furnace installation to take into account infiltration of air into the furnace, other sources of air of determinable amounts admitted to the furnace, or the desired condition of the furnace atmosphere. All of these factors are subject to variations which are not direct functions of the rate of total fuel supply. They may be termed furnace factors. These furnace factors may require further adjustment in the "total compensated air requirements" called for by the fuels. The total compensated air requirements, thus modified by these furnace factors, is herein termed "adjusted total air requirements."

It is a further object of this invention to provide improved control and proportoning mechanism which automatically proportions the totalized, compensated air requirements of the respective fuels to the adjusted total flow of air at all rates of flow.

This invention involves certain improvements over my copending applications Ser. No. 401,666, filed July 9, 1941, and Ser. No. 404,910, filed July 31, 1941.

Other aims and advantages of the invention will appear in the specification, when considered in connection with the accompanying drawing, wherein:

The figure is a diagrammatic illustration of one form of apparatus embodying the invention and applied to the control of air and two fluid fuels.

Referring particularly to the drawing, the control mechanism is shown as being applied to control the amount of secondary fuel in response to variations in flow of primary fuel and in proportion to the compensated air requirements necessary to support complete combustion of the secondary fuel. The fuels are adapted to flow through individual conduits 10 and 11 and the combustion air is supplied for both fuels through a single conduit 12, all of the conduits leading to a furnace, not shown. The primary fuel, for example, may be coke oven gas, the supply of which may vary over a wide range, and the other fuel may be natural gas, the supply of which is unlimited. The idea is to use a maximum amount of the primary fuel because of its relatively low cost and/or availability and to make up the difference in the heat demand with the secondary or make-up fuel.

The conduit 10 is shown as having a constriction 13 on the opposite sides of which are connected a pair of pipes 14 and 15 leading to opposite sides of a diaphragm 16 connected to act on one side of a pivoted jet pipe 17 of a differential pressure operated flow responsive device of a well known type. The force exerted by the diaphragm acts in opposition to a spring 18, the compression of which is controlled by a loading cam 19 of variable contour. The cam is shown as being composed of a multiplicity of relatively adjustable, slotted pieces clamped together by a bolt 20 and secured to a carriage 21 which is slidably mounted in fixed bearings. The shape of this cam is preferably adjusted to take into account the variable burner factors, so that its movements are directly proportional to the compensated air requirements necessary to support complete combustion of the primary fuel.

The flow responsive device has a ratio slider 22 which may be employed to vary the ratio of the compensated air requirements of the particular fuel in accordance with variations in the density, chemical analysis and viscosity of the fuel, as well as other factors affecting the B. t. u. content of the fuel.

The force exerted on the jet pipe by the diaphragm, due to the differential pressure on opposite sides of the constriction 13, is always counterbalanced by the force of the spring to restore the jet pipe to neutral position. The jet pipe is shown as delivering fluid to one or the other of two conduits 23 and 24 connected to operate a servomotor 25, which, in turn, operates a gear 26 meshing with a rack 27 on the carriage 21. The carriage is also shown as carrying a pointer 28 cooperating with a scale 29 reading in terms of the compensated air requirements for the primary fuel. It is connected by means of an arm 30 and link 31 to a crank arm 32 mounted on one shaft of an ordinary or summarizing, differential gear 33 which serves as a movement proportioning means. Such a differential gear is shown in detail in the aforesaid copending application Ser. No. 401,666.

The conduit 11 for the secondary fuel is also shown as having a constriction 34 across which differential pressure is created to operate the jet pipe 35 of a regulator through pipes 36 and 37 and a diaphragm 38 in the same manner as the jet pipe 17. The force exerted by the diaphragm on the jet pipe 35 is opposed by a spring 39 the compression of which is controlled by an adjustable cam 40 made of a plurality of pieces like cam 19 and mounted on a carriage 41 slidably mounted in fixed bearings. The adjusted shape of this cam likewise takes into account the variable secondary burner factors, so that its movements are always directly proportional to the compensated air requirements necessary to support complete combustion of the secondary fuel. This regulator also has a ratio slider 42 adapted to change the percentage or ratio of the compensated air or cam movements to the rate of fuel flow. Thus, both ratio sliders 22 and 42 permit the introduction of correction factors which take into account variations in the chemical analysis of the fuel, viscosity changes, density changes, etc. The jet pipe 35 acts through a pair of pipes 43 and 44 and auxiliary control means to operate the piston of a servomotor 45 which is connected to control the position of a butterfly valve 46 in the fuel conduit 11. The carriage 41 is also shown as operating a pointer 47 cooperating with a scale 48 which is calibrated in terms of the compensated air requirements for the secondary fuel.

The carriage 41 is likewise connected to the differential gear 33 by means of an arm 49 and link 50 through a second crank arm 51 on the second shaft of the differential gear. As explained in the aforesaid application Ser. No. 401,666, the differential gear has a spur gear 52, which meshes with a rack 53 on a slidable carriage 54 similar to the carriage 21. The differential gear transmits proportioning movements to the links 31 and 50. The carriage 54 also carries an adjustable cam 55 made like cams 19 and 40 and shaped to control the supply of air in accordance with its adjusted position, taking into account air infiltration in the furnace.

In other words, the shape of this cam is such that its manual adjusting movements are always proportional to the totalized, compensated air requirements of both fuels, modified by compensations which allow for air infiltration in the furnace. Hence, its movements represent the adjusted total supply of controlled air. The carriage 54 operates a pointer 56 cooperating with a scale 57 to indicate the adjusted total air flow, representing the desired heat input. This carriage is adapted to be adjusted longitudinally by any suitable means, such as a hand wheel 58, operating a pinion 59 meshing with a rack 60 connected to the carriage. It will be seen that the adjusting movement imparted to the carriage, and through it, to the differential gear 33 is the sum of the movements imparted to the separate cams 19 and 40 through the differential gear.

Now, the flow of air in conduit 12 is shown as being controlled by a butterfly valve 61 which is actuated by a piston type servomotor 62. The servomotor is connected by pipes 63 and 64 to be operated by a jet pipe regulator 65 also having a ratio slider 66 whereby the ratio may be changed at will. The cam 55 acts on one side of the jet pipe through a spring 67 and changes the setting of the regulator to control the air flow through the conduit 12. The spring acts on the jet pipe in opposition to a diaphragm 68 on the opposite side of the jet pipe, and the position of the diaphragm is controlled by the pressure differential across a constriction 69 in the air conduit 12 acting through pipes 70 and 71 on opposite sides of the diaphragm. The structure, thus far described, is substantially identical with that shown in the aforesaid copending application Ser. No. 404,910.

In the operation of the apparatus thus far described, the hand wheel 58 is used to set the air cam 55 in terms of the adjusted total rate of flow of air to maintain the desired heat input to the furnace. This adjustment imparts proportioning movements through the differential gear 33 to the cams 19 and 40 and the cam 55 remains fixed in this adjusted position, due to friction of the parts. As it is desirable to use all available primary fuel, regardless of flow variations and when it does not exceed the heat demand, the flow of that fuel will determine the position of the carriage 21 through the operation of the flow responsive device and servomotor 25. Now, the carriage 54 carrying the cam 55, which has been adjusted to cause the regulator 65 to maintain a predetermined or adjusted total flow of air, holds the gear 52 stationary, so that, any movement imparted to the arm 31 by changes in the position of carriage 21 will be imparted through the differential gearing 33 to arm 51, link 50, etc., to cam 40. This movement will control the loading cam 40 of the jet pipe regulator 35, which, in turn, operates the valve 46 to vary the flow of secondary fuel in inverse proportion to the flow of the primary fuel.

In this example, the secondary fuel regulator is connected to control the flow of primary fuel when the supply of primary fuel exceeds the heat demand. To this end, the fluid pipe 44 is connected to the upper end of the cylinder of a servomotor 72 having a piston 73 connected to control a butterfly valve 74 in the fuel conduit 10. The piston is shown, in its normal position, at the bottom of the cylinder to hold the valve 74 fully opened. Incidentally, the piston 75 of the servomotor 45 reaches the bottom of its cylinder only when the valve 46 is fully closed. Now, the bottom of cylinder 45 is connected by a pipe 76 to cylinder 72 above the normal position of the piston 73; while the bottom of cylinder 72 is connected by a pipe 77 to cylinder 45 at a point above the lowermost position of the piston 75. Both of the pistons 73 and 75 are of the unbalanced type, due to the difference between the effective pressure areas on the top and bottom because of the piston rods. When the flow of primary fuel increases and is equal to the heat demand, the primary fuel regulator and its servomotor will move the loading cam of the secondary regulator to the left through the differential gear so that the jet pipe 35 swings upwardly and delivers fluid through the pipe 43 to force the piston 75 to the bottom of its stroke, thus closing the valve 46 and opening the port to the pipe 77. Further increase in the flow of primary fuel will cause the jet pipe 35 to continue to deliver controlling fluid through the pipe 43 and the pipe 77 to raise the piston 73 to operate the valve 74 and restrict the flow of the primary fuel. Thus, the secondary fuel regulator actually controls the supply of the primary fuel only after it has functioned to cut off the supply of secondary fuel. However, if there is again a deficiency in the flow of the primary fuel, its flow responsive device and servomotor will operate through the differential gear to move the loading cam 40 and the jet pipe 35 of the secondary fuel regulator in the opposite direction and thereby restore both pistons 73 and 75 to their initial operating positions, as shown, with the secondary fuel valve 46 partially open.

It will be understood that the regulators, servomotor and the cams may be mounted on any suitable support, such as a table. The stroke of the cams can be made the same for all controls by choosing the necessary gear ratio of the differential gears and the cams may be guided for straight line movement in any convenient manner, for example by wheeled carriages or the like. Moreover, the indicators may be either mechanical or electrical and all of them may be located at any convenient point. Furthermore, either mechanical or electrical means may be employed to control the supply of primary fuel by the operation of the secondary fuel regulator.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. Apparatus for controlling and proportioning the supply of a primary fuel and at least one secondary fuel to the adjusted total controlled supply of air for a furnace, wherein the flow of primary fuel varies, comprising, in combination, individual conduits for the air and the respective fuels; manually settable control means connected to the air conduit constructed and arranged to maintain the adjusted supply of controlled air constant in accordance with the desired heat conditions in the furnace; movement proportioning means, including differential gearing, connected to be operated by the adjustments of the manually settable means; flow responsive means connected to the primary fuel conduit, including a servomotor operable in response to changes in the rate of flow of the primary fuel; a member operable by the servomotor forming a part of the flow responsive means constructed and arranged to be moved from a zero position corresponding to zero flow of the fuel in proportion to the compensated air requirements necessary to support complete combustion of the primary fuel; means connecting said last named member to impart its movements to the differential gearing; and flow control means connected to the secondary fuel conduit having a member connected to be operated by the movements imparted through the differential gearing in response to variations in the flow of the primary fuel, said member being so constructed and arranged that its operation is such that it effects control of the secondary fuel to make up for deficiency in the primary fuel in terms of compensated air requirements of the secondary fuel; and means associated with the secondary fuel control means and connected to the primary fuel conduit constructed and arranged to be operated only when the supply of primary fuel exceeds the demand and the secondary fuel is cut off by its control means, to reduce the rate of flow of the primary fuel.

2. Apparatus for controlling and proportioning the supply of a primary fuel and at least one secondary fuel to the adjusted total controlled supply of air for a furnace, wherein the flow of primary fuel varies, comprising, in combination, individual conduits for the air and the respective fuels; manually settable control means connected to the air conduit constructed and arranged to maintain the adjusted supply of controlled air constant in accordance with the desired heat conditions in the furnace; movement proportioning means, including differential gearing, connected to be operated by the adjustments of the manually settable means; flow responsive means connected to the primary fuel conduit, including a servomotor operable in response to changes in the rate of flow of the primary fuel; a member operable by the servomotor forming a part of the flow responsive means constructed and arranged to be moved from a zero position corresponding to zero flow of the fuel in proportion to the compensated air requirements necessary to support complete combustion of the primary fuel; means connecting said last named member to impart its movements to the differential gearing; and flow control means connected to the secondary fuel conduit having a member connected to be operated by the movements imparted through the differential gearing in response to variations in the flow of the primary fuel, said member being so constructed and arranged that its operation is such that it effects control of the secondary fuel to make up for deficiency in the primary fuel in terms of compensated air requirements of the secondary fuel; a valve in said primary fuel conduit; and means connecting said secondary fuel regulator to operate said valve constructed and arranged to cut down the flow of primary fuel when its available supply exceeds the heat input demand and after the secondary fuel is cut off.

3. Apparatus for controlling and proportioning the supply of a primary fuel and at least one secondary fuel to the adjusted total controlled supply of air for a furnace, wherein the flow of primary fuel varies, comprising, in combination, individual conduits for the air and the respective fuels; manually settable control means connected to the air conduit constructed and arranged to maintain the adjusted supply of controlled air constant in accordance with the desired heat conditions in the furnace; movement proportioning means, including differential gearing, connected to be operated by the adjustments of the manually settable means; flow responsive means connected to the primary fuel conduit, including a servomotor operable in response to changes in the rate of flow of the primary fuel; a member operable by the servomotor forming a part of the flow responsive means constructed and arranged to be moved from a zero position corresponding to zero flow of the fuel in proportion to the compensated air requirements necessary to support complete combustion of the primary fuel; means connecting said last named member to impart its movements to the differential gearing; and flow control means connected to the secondary fuel conduit having a member connected to be operated by the movements imparted through the differential gearing in response to variations in the flow of the primary fuel, said member being so constructed and arranged that its operation is such that it effects control of the secondary fuel to make up for deficiency in the primary fuel in terms of compensated air requirements of the secondary fuel; and flow control means for the primary fuel connected to the secondary fuel regulator and constructed and arranged to restrict the flow of the primary fuel so that it corresponds to the demand after the secondary fuel is cut off.

4. Apparatus, as set forth in claim 1, wherein the manually settable control means comprises a hydraulic regulator having a manually movable spring loading cam constructed and arranged to be adjusted in accordance with the total heat demand.

5. Apparatus, as set forth in claim 1, wherein the manually settable control means comprises a jet pipe regulator having a manually movable loading cam of adjustable contour, the contour of the cam being so shaped that it takes into account air infiltration into the furnace.

6. Apparatus, as set forth in claim 1, wherein the flow responsive means also includes a jet pipe responsive to changes in the primary fuel flow connected to operate said servomotor, and the member operable by the servomotor is a spring loading cam of adjustable contour associated with the responsive means.

7. Apparatus, as set forth in claim 2, wherein the flow responsive means and the flow control means are of the hydraulic type having movable spring loading cams, and said proportioning means comprises differential gearing.

8. Apparatus, as set forth in claim 2, wherein the manually movable adjusting member has an associated indicator.

9. Apparatus, as set forth in claim 3, wherein air is supplied to the furnace in accordance with the heat input demand and a manually settable air regulator is employed to control the amount of air supplied, said manually settable regulator being operatively connected to the movable member of the flow responsive device which measures the flow of the primary fuel and to the member of the flow control device for the secondary fuel which is operated by movements transmitted by the differential gearing.

HERBERT ZIEBOLZ.